United States Patent [19]

McIntosh

[11] Patent Number: 4,580,909
[45] Date of Patent: Apr. 8, 1986

[54] ANCILLARY DEVICE FOR FOOD PREPARATION

[76] Inventor: Rickey G. McIntosh, 3001 N. Russell Rd., Bloomington, Ind. 47401

[21] Appl. No.: 744,564

[22] Filed: Jun. 14, 1985

[51] Int. Cl.$^4$ .............................................. G01K 1/14
[52] U.S. Cl. .................................. 374/141; 374/155; 374/208; 99/343; 294/3
[58] Field of Search ............... 374/141, 149, 155, 208, 374/210; 294/2, 3; 99/342, 343

[56] References Cited

U.S. PATENT DOCUMENTS

| | | | |
|---|---|---|---|
| 2,040,676 | 5/1936 | Stevens et al. | 99/343 |
| 2,141,759 | 12/1938 | Moffat | 374/141 |
| 3,060,585 | 10/1962 | Kirk | 374/141 |
| 3,270,661 | 9/1966 | Juvan | 99/343 |
| 3,373,611 | 3/1968 | Trott | 374/155 |
| 3,382,512 | 5/1968 | Atchley | 374/141 |
| 3,394,593 | 7/1968 | Aldrigde et al. | 99/343 |
| 3,552,210 | 1/1971 | Wright, Jr. | 374/155 |
| 3,651,405 | 3/1972 | Whitney et al. | 374/155 |
| 3,736,861 | 6/1973 | Kroyer et al. | 99/343 |
| 4,156,365 | 5/1979 | Heinmets | 374/162 |

Primary Examiner—Charles Frankfort
Assistant Examiner—Thomas B. Will
Attorney, Agent, or Firm—Robert A. Spray

[57] ABSTRACT

An ancillary device for food-preparation, which provides a combination implement which both provides a a food-handler device and a probe for determining the interior temperature of the food being handled. The device in a desired form resembles a pair of tongs, and they not only carry a temperature-sensing probe and visual signal or gauge, they carry a structure which positions the probe midway of whatever is the span of opening of the food-gripping jaws of the tongs; and since the tongs' jaws, as they engage upon the food article, automatically sense the overall thickness of the food article, their positioning of the temperature-sensing probe midway of the span of the jaws' opening automatically achieves a sensing of the food article's temperature at the midpoint of its thickness, thus giving better and more reliable information as to the thoroughness of the cooking procedure. Optional spatula jaws are also provided.

11 Claims, 10 Drawing Figures

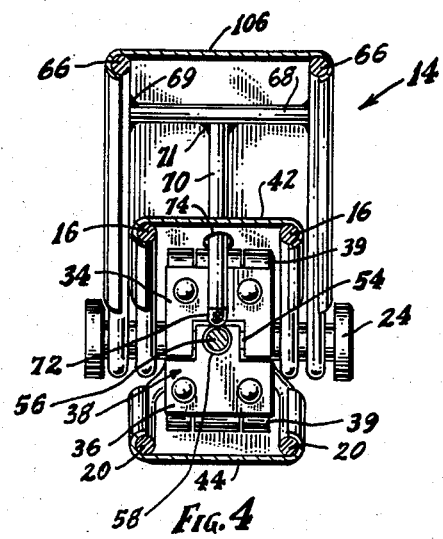
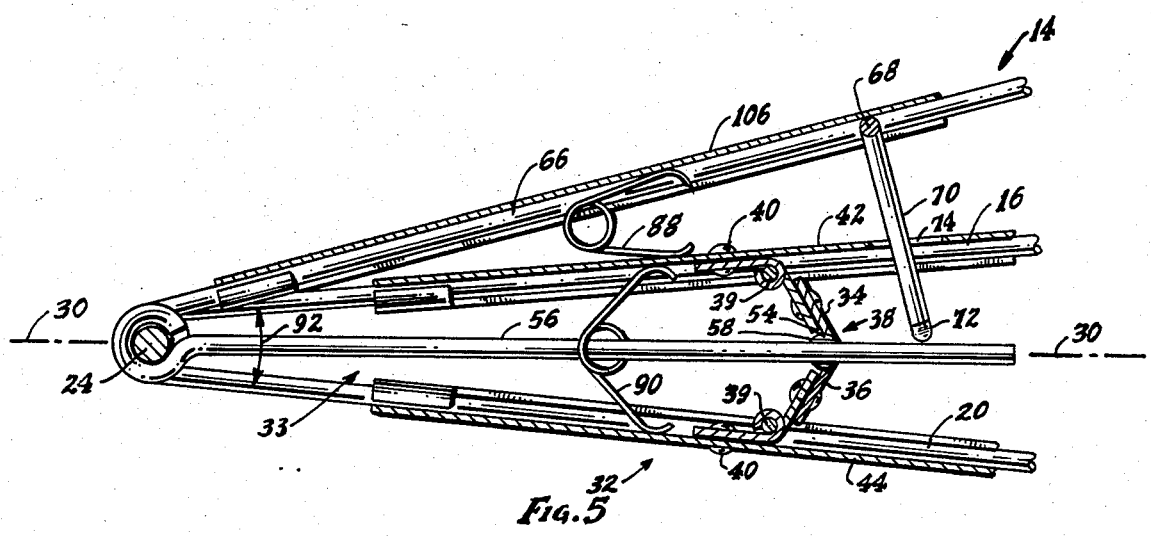
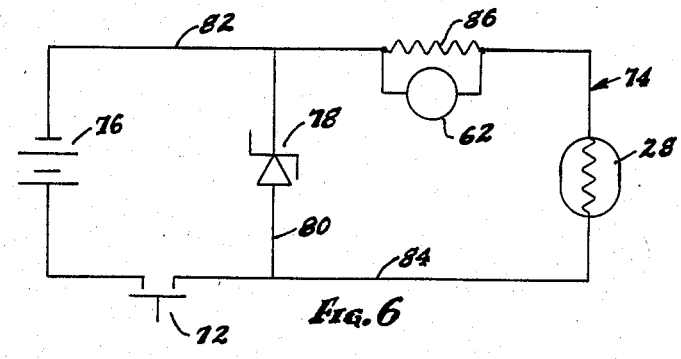

ANCILLARY DEVICE FOR FOOD PREPARATION

BACKGROUND AND FIELD OF THE INVENTION

The present invention relates to an ancillary device useful to a cook in a food preparation procedure, such as in the baking or frying of a food object such as a piece of meat, a potato, loaf of bread or other pastry object, etc.

More particularly, the present invention provides a device which achieves a dual purpose and function of determining the interior temperature of the food article. Desirably, and in the disclosed embodiment, the device also provides a pair of tongs or the like by which the food article may be handled and/or carried.

And since both of the related functions of temperature-sensing and article-handling may be performed by the device, and in the same action, the inventive concepts and achievements may be considered as an advantageous device of combination nature; although the concepts are not limited to a combination nor to a utilization as a combination, even though the use as a handler device would automatically provide at least the sensing of the food article's interior temperature, and the use of the device as a temperaturesenser of that nature always involves at least a small amount of article-handling.

In cooking procedures there is usually, of course, an externally-seen visual indication or effect of the cooking process; and with some skill and experience a thoughtful cook can, by those externally-viewable indications, deduce the amount of thoroughness of the cooking procedure as to the article's interior, and perhaps even estimate the interior temperature. But, at best, such deductions and/or estimates are beset with inaccuracies, of various causes, and of such an extent that many times the food article will be undercooked and thus untasty, requiring a re-heating which involves a similar risk of inaccuracy, loss of time, wasted labor, etc., or the article will be overcooked, with obvious disadvantages, and perhaps ruining the article, great disadvantages in both commercial and family cooking situations.

Accordingly, the achievements of the present invention provide a convenient and handy device which provides, by the same device and in the same procedure, a convenient means of handling and/or carrying the food article, and also of measuring its interior temperature.

Further, a more particular achievement is the measurement at the midpoint of the thickness of the food article, regardless of the thickness of the article; for the device is such that there is made an automatic thrusting of the temperature-sensing probe to the midpoint of the food article by the action of applying the food-handling components to the external portion of the food article, in merely a conventional a food-handling manner.

THE PRIOR ART

Of course food-handling tongs have been known and used for scores of years; and temperature-sensing probes have been also long known, by which an interior temperature of a food article could be sensed or measured.

However the existence of such articles of the prior art is not only conceded, it is emphasized; for it is with long-known components that the present inventive concepts build, accomplishing a device and an operativity much greater than just the functions of those long-known articles of the prior art; and thus the inventive significance of the present concepts is emphasized, and the nature of the concepts and their results can perhaps be easier understood.

Even further as indicating the inventive nature of the present concepts is the result of a Preliminary Patentability Search made in the search files of the U.S. Patent Office, after this invention was made, and during the course of considering the desire and likelihood of patent protection.

The Search produced the following, all U.S. Patents: U.S. Pat. Nos. 2,040,676; Stevens et al., (1936); 2,141,759 Moffat, (1938); 3,060,585 Kirk, (1962); 3,382,512 Atchley, (1968); 3,394,593 Aldridge et al., (1968); 3,736,861 Kroyer et al., (1973); 4,156,365 Heinmets et al., (1979).

None of those show the concepts of either embodiment of the present invention. The Kirk patent emphasizes the significance of thickness of the food product, but only indicates a recommended cooking period, not achieving a midthickness temperature. Moffat shows tongs for hair-setting rather than for foodstuffs, and although it senses temperature there is no concept of automatically probing midway of the tongs-jaws. Atchley shows a food handler with a means for sensing temperature, but again there is no concept of sensing a temperature midway of gripping jaws.

The other references show cooking devices incorporating some type of temperature indicators, further emphasizing that food handler devices have long embodied temperature sensors; but nevertheless no prior art shows an automatic means of sensing the mid-thickness temperature of the food article, particularly none which would automatically assure that the temperature sensing probe would be positioned at the midpoint of the thickness of the food article.

BRIEF DESCRIPTION OF INVENTIVE CONCEPTS AND OPERATIVITY

In carrying out the invention, there are provided handling tongs and a temperature-sensing probe means; and there are also provided means which sense the spacing of the tongs jaws and which control the probe means and which control the temperature-reading to be when the probe is at the point of mid-thickness of the food article.

Two embodiments are shown, differing with respect to how the temperature-reading probe is controlled to be penetratable into the food article only half-way of the spacing of the tongs jaws, and thus half-way of the thickness of the article, and to assure that the temperature is sensed only while the probe is so positioned.

The above description is of somewhat introductory and generalized form. More particular details, concepts, and features are set forth in the following and more detailed description of illustrative embodiments, taken in conjunction with the accompanying drawings.

BRIEF DESCRIPTION OF THE DRAWING

The drawings are of somewhat of a generally schematic or diagrammatic nature for illustrating the inventive concepts:

FIG. 4 is a generally vertical transverse cross-sectional view, enlarged but generally as taken by Section-line 4—4 of FIG. 2;

FIG. 5 is a longitudinal vertical cross-sectional view, of a detail nature, generally as shown by Section-line 5—5 of FIG. 1, and on a scale about the same as FIG. 4, and about double that of FIGS. 1,2 and 3;

FIG. 6 is a schematic diagram of a meter circuit;

DETAILED DESCRIPTION OF THE EMBODIMENTS

Figure 1:
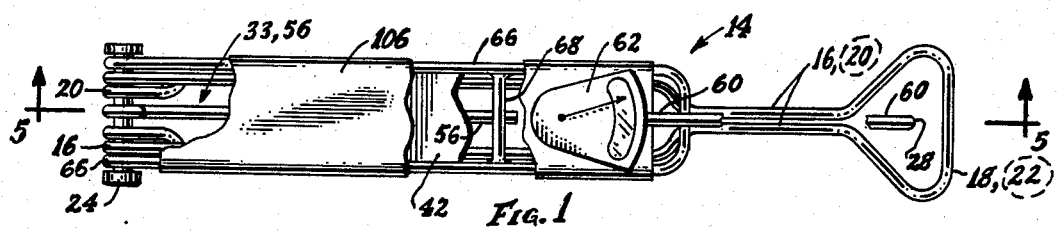
FIG. 1 is a top view of an ancillary device for food preparation, according to an illustrative embodiment, portions shown as broken away in draftsman's convention to illustrate details otherwise hidden.

As shown in the drawings, FIGS. 1-6,9 and 10 illustrate a first embodiment which provides a novel and advantageous ancillary device 14 for food-preparation.

The device 14 as shown includes a tongs device comprising a pivotally interconnected upper longitudinal tong member 16 having on its free end a first abutment means 18, and a lower longitudinal tong member 20 having on its free end a second abutment means 22, those abutments 18 and 22 providing tongs jaws; and there is shown a transverse pin 24 at the end of the device 14 opposite the abutment means 18 and 22, for providing a connection means interconnecting the first abutment means 18 and the second abutment means 22 but permitting their relative movement, as is the movement of the tongs-jaws 18-22 to grasp an article 26.

Figure 2:
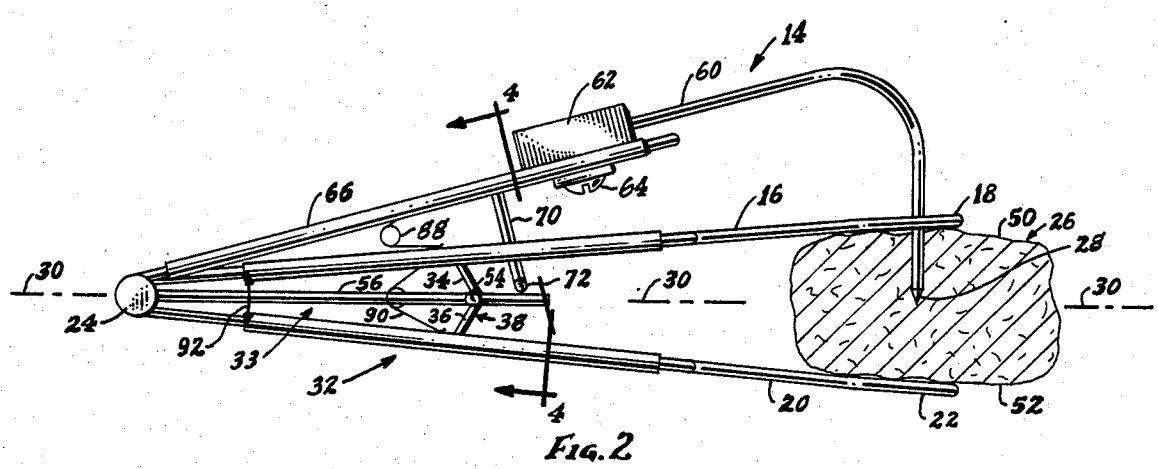
FIG. 2 is a side elevation view of the ancillary device shown in FIG. 1, in use with a relatively thick food article.
Figure 3:
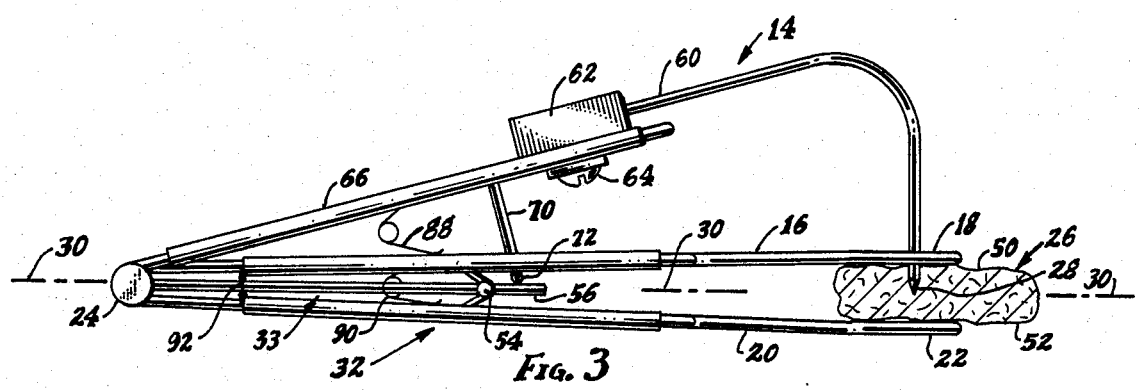
FIG. 3 is a side elevational view of the device, as in Fig, 2, but showing the device in use with a relatively thin food article.

The operativity of the device 14 is easily visualized by observing that in each of FIGS. 2 and 3, the abutments 18 and 22 grasp quite different thicknesses of a food article 26, yet nevertheless a temperature-sensing probe means 28 is being automatically positioned by the device 14 to be at a mid-point of the thickness of the food article 26, noting the probe means 28 touching the centerline axis 30 of members 16 and 20 in both FIGS. 2 and 3.

As just mentioned, there is provided a temperaturesensing probe means 28; and as now detailed there are provided spacing-sensing means 32 which determine the spacing of the first abutment means 18 and the second abutment means 22 for correspondingly controlling the position of the probe means 28, achieving the desired measurement of the mid-thickness temperature of the food article 26.

Although it is difficult to specify certain components as being a part of the spacing-sensing means 32 rather than of a location-control means 33 to which it closely relates, or vice versa, the two components 32 and 33 together are shown (especially FIG. 5) as comprising links or leaves 34, 36 of a hinge-like component 38, which has its leaves or links 34 and 36 respectively pivotally (as at 39) connected to tongs-members 16 and 20 as by rivets 40 to panel-like body members 42 and 44 respectively of tongarms 16 and 20.

The location-control means 33, responsive to the spacing-sensing means 32, controls the location of the temperature-sensing probe means 28, to cause it to be in a controlled position as mentioned above; i.e., with respect to the relative spacing of the first abutment means 18 and the second abutment means 22, the controlled position of the temperature-sensing probe means 28 as thus controlled is shown as midway between the first abutment means 18 and second abutment means 22 regardless of what is the dimension of that spacing.

Being so operative, the temperature-sensing probe means 28 thus is automatically in a position to sense the mid-thickness temperature of the food article 26 upon whose outer surfaces (upper 50 and lower 52) the first abutment means 18 and the second abutment means 22 are respectively then engaging, regardless of the thickness of the food article 26.

Turning to more details of the operational components, it will be noted that the pin 24 provides a connection means comprising a pivot means by which the first tongsarm 16 and the second tongs-arm 20 are pivotally interconnected at what might be referred to as a first pivot axis, i.e., the axis of pin 24; and the links or leaves 34 and 36 are also pivotally interconnected at a transverse pin 54, the adjacent ends of links 34, 36, i.e., their ends remote from their connection to tongs-arms 16, 20, being pivotally interconnected at what might be referred to as a second pivot axis, i.e., the axis of pin 54. It is to be noted also that the pivot axis 54 lies along the central axis 30 mentioned above, because the links or leaves 34, 36 are operatively of the same length, and their connections 40 to the arms 16, 20 are operatively at the same distance from the pivot axis 24.

There is also shown control arm means 56 which is operatively connected to the first pivot axis 24 and the second pivot axis 54, that control arm 56 being rotatably connected on pin 24 and slidable in a hole 58 in the hingelike member 38's transverse pin 54; and, as shown below, the control arm 56 control the position of the temperaturesensing probe means 28.

The operativity of the link means 34, 36 and the control arm means 56, as now shown, is that the control arm 56 is kept in a position operatively bisecting the angle between the first tongs-arm 16 and the second tongsarm 20, thus holding the temperature-sensing probe means 28 midway between the first abutment means 18 and the second abutment means 22 regardless of the spacing therebetween.

More particularly as shown, the probe 28 control by control arm means 56 is as follows, still observing details of the first embodiment of FIGS. 1-5 in this respect: The temperature probe 28 is carried by a carrier arm 60 of a temperature meter or gauge 62 clamped as by screw 64 to a carrier arm means 66 whose end is pivotally connected to the pivot pin 24.

Moreover, at a generally central location of the carrier arm means 66, that means 66 is provided with a transverse mounting strip 68 as by connector welds 69; and from the strip 68 there extends, generally perpendicularly to the arms 60 and 66, a guide rod 70 (held as by welds 71) which carries on its lower end an actuator switch 72. The rod 70 freely extends downwardly, through a hole 74 in the transverse panel 42 of upper tongs-arm 16.

The operative length of the guide rod 70 is such that when the switch 72 is operatively contacting the control arm means 56 (which means 56 lies along the central axis 30 by its rotatable connection to pin 24 and its slidability in pin 54) in switch-actuated contact with the means 56, the probe 28 is also on that central axis 30.

The hinge-like member 38, with its pin 54 and its hole 58 (which receives the control arm 56) always remaining on the central axis 30 (because of the equality of lengths of links 34 and 36 and their common distance from pivot pin axis 24) regardless of the spacing of the tongs-arms 16–20 and their respective tongs-jaws or abutments 18–22, and the actuator switch 72 being limited in downward travel to engagement with arms 56 and thus also operatively on the central axis 30, the temperature probe 28 will always be midway between the tongs-abutments 18, 22, thus to sense the temperature of the food 26 midway of its thickness.

The temperature-sensing circuitry is shown in FIG. 6 (although the wiring 14 is omitted in the other views as unnecessary to understanding, and as likely to obscure other understanding). In FIG. 6, the meter 62 is shown as in series with the probe 28, the battery 76, and the actuator switch 72. A diode 78 is shown to hold the voltage constant, it being in a line 80 connected between the wiring 82 connecting the battery 76 and the meter 62, and the wiring 84 connecting the switch 72 and probe 28, the latter desirably a thermistor. A resistance 86 may be connected across the meter 62 if desired as shown.

Springs of compression and torsion type are shown. The stronger spring is the probe spring 88 between the probe's carrier arm means 66 and the upper tongs-arm 16; and the weaker of the springs is the tongs spring 90 between the two tongs-arms 16 and 20.

Summarizing the operativity, the user will scoop the meat-chunk or other food article 26 between the tongs-abutments 18-22, by squeezing the control arm 66 and the lower tongs-arm 20 toward one another.

The relatively weak tongs-spring 90, which serves only to spread the tongs-arms 16, 20 and the tongs-abutments 18, 22 when no pressure is being applied to control arm 66 and lower tongs-arm 20, collapses from the force and pressure transmitted by the stronger probe spring 88, until the tongs-abutments have come to rest with the food article 26 being held between the tongs-abutments 18, 22, although the probe 28 has not entered the food article 26, and the guide rod 70 and its actuator switch 72 are not yet operatively bearing against the control arm 56 due to the higher strength of probe spring 88 in comparison to that of the tongs spring 90. (This initial and intermediate condition is not shown in any of FIGS. 2,3 or 5.)

As pressure is continued by the cook's manual squeezing of arms 66 and 20, the probe spring 88 exerts force and pressure onto the upper tongs-arm 16, which with the co-operation of the lower tongs-arm 20 now snugly grips the food article 26 (a condition still prior to that shown in either of FIGS. 2,3 or 5).

Then, as the user's force and pressure on the carrier arm means 66 further increases, the compression or collapse of the probe spring 88 lets the carrier arms 66 and 60 move downwardly with respect to the upper tongs arm 16, as indicated in all of FIGS. 2,3, and 5, carrying with those arms 66 and 60 the temperature probe 28, it penetrating into the food article 26.

And since all that time the pivot pin 54 of the hinge-like component 38 is sliding outwardly relative to the control arm 56, and the hinge links or leaves 34, 36 are pivoting, the control rod 56 is kept on the central axis 30, continually at a position bisecting the angle 92 between the tongs-arms 16, 20, thus guiding the guide rod 70 (and its actuator switch 72) to keep their lower end at and along that same central axis 30. Thus, the probe 28 is automatically fed to the midpoint of the food article 26 but no farther.

Pressure of the actuator switch 72 on the control rod 56, which happens only when the parts have reached the temperature-sensing position of FIGS. 2, 3, and 5, then closes the switch 72 to actuate the temperature-reading circuit 74.

If the cook determines that the mid-thickness temperature is sufficient, the cook releases pressure on the carrier arm 66, and the strong probe spring 88 causes arms 66 and 60 (and probe 28) to move upwardly, the probe 28 moving out of the food article 26, but the lighter nature of the tongs-spring 90 lets the tongs-abutments 18, 22 still grip the food article 26, in a conventional nature of a tongs use of the tongs-arms 16, 20.

Figure 9:
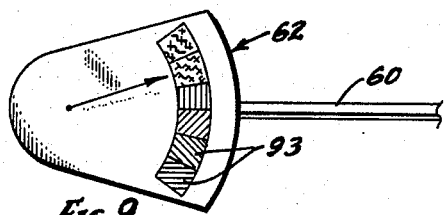
FIG. 9 is a top or plan view of the meter face.

As indicated in FIG. 9, the face or dial of the meter 62 may desirably have colored or patterned areas 93 instead of merely numbers, giving a color-code indication of temperature. For example, a very light pink area could be the color indicator for the highest reading, with a deep red or brown being the color indicator for the coolest.

Figure 10:
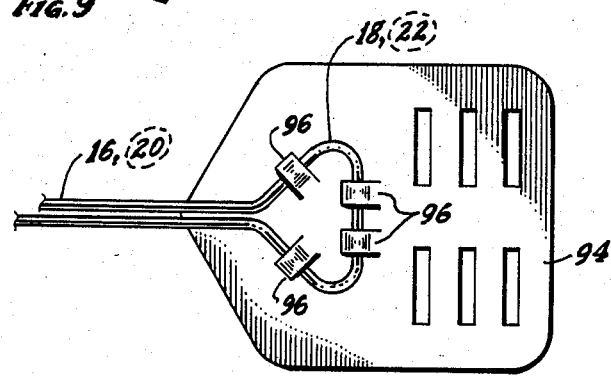
FIG. 10 is a plan view of one of a pair of auxiliary spatulas for the tongs of either embodiment.

Preferably as indicated in FIG. 10, the tongs-abutments 18, 22 are each provided with a clip-on spatula 94. The spatula 94 is shown as having a sufficient number of ears or clips 96 integrally struck from the spatula 94, and all directed in the same general direction, to retain the spatula 94 onto the tongs-abutment 18 or 22 when handling ground meat as the food article 26, for such an article has a tendency to puff up into a ball when cooking. The stiff stock of heavy wire or rod and bent into a loop, as shown in the various views, is satisfactory for meat slices and other foodstuffs; but the spatulas 94 are easily attached and removed when desired.

Figure 7:
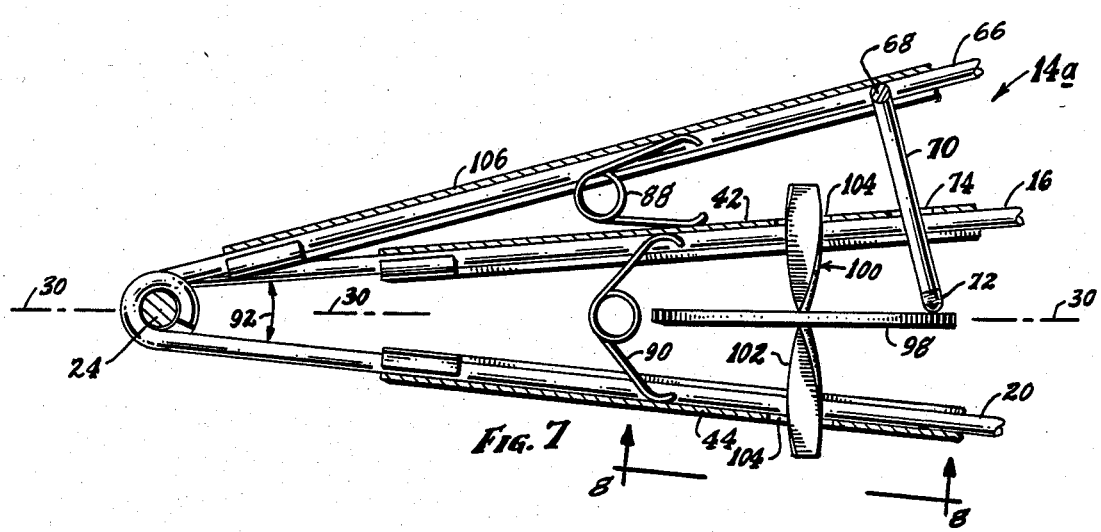
FIG. 7 is a longitudinal vertical cross-sectional detail-nature view of a second embodiment of the ancillary food-preparation device, this FIG. 7 view of the second embodiment generally corresponding to FIG. 5 as to the first embodiment; and this second embodiment may be considered as preferred as probably of more economical construction and assembly than the first embodiment.
Figure 8:
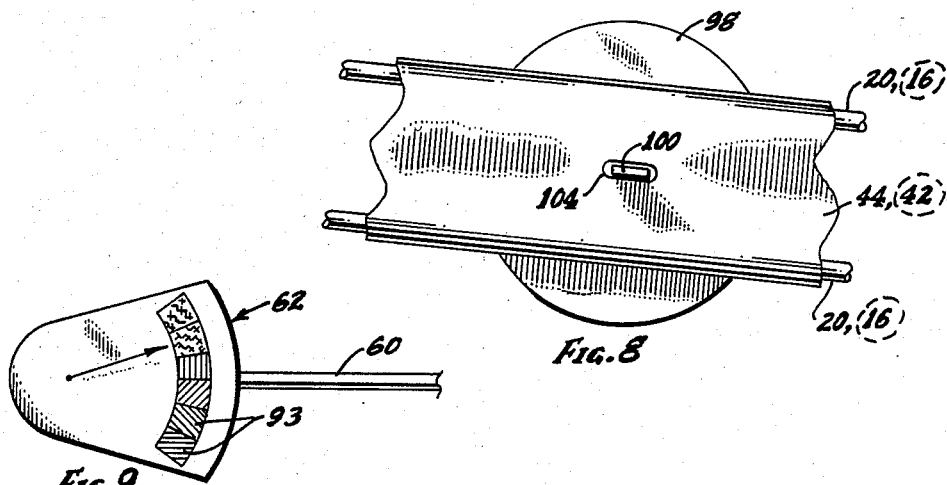
FIG. 8 is a detail-nature view of the second embodiment, shown generally as taken by View-line 8—8 of FIG. 7.

FIGS. 7 and 8 illustrate a preferred embodiment 14a in which all the parts may be and as shown are identical with all those of the first embodiment, as indicated by correspondence of reference numerals of the two embodiments, except that the control rod 56 and hinge mechanism 38 of the first embodiment are replaced in FIGS. 7 and 8 with a centering disk 98 and a guide rod member 100.

There is shown in those views that the disk 98 is carried midway between the first arm 16 and second arm 20 by the guide rod member 100 having a spiralling nature indicated by the turns 102. It is to be noted that the portions of the guide rod member 100 extending on either side of the disk are of opposite hand, and those guide rod member portions are of non-circular cross-section.

Further, it will be noted that the first arm 16 and second arm 20 (by holes provided in their transverse panels 42 and 44), are provided with a guide 104 of non-circular form, corresponding to that of the rod member 100.

Thus, noting FIGS. 7 and 8, it will be noted as to the second embodiment that as the user manipulates the first arm 16 and second arm 20 by squeezing them toward one another, the panel guide holes 104 abut the spiralling portions 102 of the guide rod member 100 to cause the disk 98 to remain midway between the first arm 16 and the second arm 20 regardless of their spacing relative to one another. The disk 98 revolves, but does not move off the central axis 30.

The disk 98, thus remaining on the central axis 30 which bisects the angle between the arms 16, 20 and the tongs-jaws abutments 18, 22, thus serves as does the control arm 56 of the first embodiment; and for brevity the details of that guide-control of the probe 28 and the actuation of actuator switch 72 thus will not be repeated for this second embodiment, the latter of course having corresponding components 28, 60, 62, 70, 72, 74, 88, and 90 and others of the first embodiment, except with the exceptions already noted as to components 38 and 56.

In both embodiments, a transverse cover panel 106 is shown as extending between the parallel bars or rods 66, providing a covered appearance as well as providing a a convenient panel onto which the user can apply manual force; and the panel 106 may be similarly connected to the bars 66 as the panels 42 and 44 are connected to the upper arm 16 and lower arm respectively, i.e., simply by having end-portions crimped over the bar sets which comprise each of the arm members.

The springs 88 and 90 may be secured in their respective locations by having a leaf of each tack-welded to one of the arms 16, 20, or 66, although such retention or other type of retention is no part of the inventive concepts.

SUMMARIZATION

It is thus seen that an ancillary device for food preparation, according to either of the embodiments, provides a desirable and advantageous device for food preparation use when made according to the inventive concepts, and provides desired and advantageous improvements for providing not only food-handling tongs with cooking temperature sensing means, but an assurance of reading the temperature existing at the midpoint of the thickness of the food article.

Accordingly, it will thus be seen from the foregoing description of the invention and its concepts according to these illustrative embodiments, considered with the accompanying drawings, that the present invention provides, in combination, new and useful concepts for a combined tongs device and a cooking temperature sensor, having the special capability of assuring a sensing of the mid-thickness temperature of the food articles, and in general providing utility from various standpoints such as pointed out herein, yielding desired advantages and characteristics, and accomplishing the intended objects including those hereinbefore pointed out and others which are inherent in the invention.

Modifications and variations may be effected without departing from the scope of the novel concepts of the invention; accordingly, the invention is not limited to the specific embodiments or form or arrangement of parts herein described or shown for the components of each embodiment.

I claim:

1. An ancillary device for food-preparation, comprising, in combination:
   a first abutment means;
   a second abutment means;
   connection means interconnecting the first abutment means and the second abutment means but permitting their relative movement;
   spacing-sensing means which determine the relative spacing of the first abutment means and the second abutment means;
   a temperature-sensing probe means;
   location-control means which are responsive to the spacing-sensing means, to control the location of the temperature-sensing probe means to cause it to be in a controlled position with respect to the relative spacing of the first abutment means and the second abutment means, the controlled position of the temperature-sensing probe means as thus controlled being midway between the first abutment means and second abutment means regardless of what the relative spacing is, and the temperature-sensing probe means thus being automatically in a position to sense a mid-thickness temperature of a food article upon whose outer surfaces the first abutment means and the second abutment means are respectively then engaging, regardless of the thickness of the food article.

2. An ancillary device for food-preparation, according to claim 1, in a combination in which the first abutment means and the second abutment means comprise a pair of tongs.

3. An ancillary device for food-preparation according to claim 1, in a combination in which the first abutment means and second abutment means are respectively carried on a first arm and a second arm,
   the connection means comprising a pivot means by which the first arm and the second arm are pivotally interconnected at a first pivot axis;
   the location-control means comprising a pair of link means respectively operatively pivotally connected at one end to the first arm and the second arm, their other ends being pivotally interconnected at a second pivot axis;
   and there is a control arm means operatively connected to the first pivot axis and the second pivot axis, it controlling the temperature-sensing probe means;
   the operativity of the link means and the control arm means being that the control arm means is kept in a position operatively bisecting the angle between the first arm and the second arm, and thus holding the temperature-sensing probe means midway between the first abutment means and the second abutment means regardless of the spacing therebetween.

4. An ancillary device for food-preparation according to claim 3, in a combination in which there is provided a carrier arm means which carry the temperaturesensing probe means, and the carrier arm means carries a guide means which operatively abuttingly engages the control arm means to regulate the position of the temperaturesensing probe means.

5. An ancillary device for food-preparation according to claim 4, in a combination in which there is provided a temperature meter to indicate the temperature sensed by the temperature-sensing probe means, and the guide means carries an actuator means which actuates the temperature meter by operative engagement with the control arm means.

6. An ancillary device for food-preparation according to claim 4, in a combination in which there are provided a first spring means for urging the carrier arm means away from the first arm and the second arm, and a second spring means for urging the first arm and second arm away from one another, the first said spring means being stronger than the second spring means, permitting the first arm and second arm to serve as tongs prior to the carrier means causing the probe means to penetrate the food article.

7. An ancillary device for food-preparation according to claim 1, in a combination in which the first abutment means and second abutment means are respectively carried on a first arm and a second arm, the spacing-sensing means and the locationcontrol means comprising a disk carried midway between the first arm and second arm by a guide rod member having a spiralling nature and the portions of the guide rod member extending on either side of the disk being of opposite hand, those guide rod member portions being of non-circular crosssection, the said first arm and second arm each being provided with a guide of non-circular form, the arrangement providing that as the user manipulates the first arm and second arm by squeezing them toward one another, the guides abut the spiralling portions of the guide rod member to cause the disk to remain midway between the first arm and second arm regardless of their spacing relative to one another, and there is provided carrier arm means which carry the temperature-sensing probe means, the carrier arm means carrying a guide means which operatively abuttingly engages the disk to regulate the position of the temperaturesensing probe means.

8. An ancillary device for food-preparation according to claim 7, in a combination in which there is provided a temperature meter to indicate the temperature sensed by the temperature-sensing probe means, and the guide means carries an actuator means which actuates the temperature meter by operative engagement with the disk.

9. An ancillary device for food-preparation according to claim 7, in a combination in which there are provided a first spring means for urging the carrier arm means away from the first arm and the second arm, and a second spring means for urging the first arm and second arm away from one another, the first said spring means being stronger than the second spring means, permitting the first arm and second arm to serve as tongs prior to the carrier means causing the probe means to penetrate the food article.

10. An ancillary device for food-preparation according to claim 1, in a combination in which at least one of said abutment means is of an open loop nature and there is provided for said open loop abutment means a A pair of tongs having jaws of an open loop nature, and there being provided for each tongs-jaw a spatula member, the spatula member each having ears directed in the same general direction and providing that the spatula may be attached and removed from said open loop abutment means at will, for achieving optionality of the nature of the abutment means which serve to grip the article being grasped by the device.

11. An ancillary device for food-preparation according to claim 10, in which the ears are integrally formed from the material of the spatula.

* * * * *

UNITED STATES PATENT AND TRADEMARK OFFICE
CERTIFICATE OF CORRECTION

PATENT NO. : 4,580,909

DATED : April 8, 1986

INVENTOR(S) : Rickey G. McIntosh

It is certified that error appears in the above—identified patent and that said Letters Patent is hereby corrected as shown below:

Col. 1, l. 18: Correct the spelling of the compound word-portion: ture-sensing

Col. 1, l. 26: Correct the spelling of the compound word: temperature-senser

Col. 4, l. 45: Correct the spelling of the word: controls

Col 4, l. 46: Correct the spelling of the compound word: temperature-sensing

Col 5, l. 14: Correct the designation: 16,20

Col 5, l. 15: Correct the designation: 18,22

Col 5, l. 39 and 40: Correct the spelling of the compound word: tongs-abutments

Col. 5, l. 40: Correct the designation: 18,22

Col. 7, l. 61: Change "I claim" to: -- Claims --

Col. 8, l. 51: Correct the spelling of the compound word-portion: temperature-sens-

UNITED STATES PATENT AND TRADEMARK OFFICE
CERTIFICATE OF CORRECTION

PATENT NO. : 4,580,909
DATED : April 8, 1986
INVENTOR(S) : Rickey G. McIntosh

It is certified that error appears in the above-identified patent and that said Letters Patent are hereby corrected as shown below:

Col. 8, l. 55: Correct the spelling of the compound word-portion: perature-sensing Col. 9, l. 9: Correct the spelling of the compound word: location-control Col. 9, l. 15: Correct the spelling of the compound word-portion: cross-sec- Col. 9, l. 29: Correct the spelling of the compound word-portion: temperature-sensing Col. 10, l. 19-21: Delete the phrase: -- A pair of tongs having jaws of an open loop nature, and there being provided for each tongs-jaw a --

Col. 10, l. 22: Delete the word --each--.

Signed and Sealed this

Twenty-eighth Day of October, 1986

[SEAL]

Attest:

DONALD J. QUIGG

*Attesting Officer*  *Commissioner of Patents and Trademarks*